(12) United States Patent
Shiga et al.

(10) Patent No.: US 8,888,611 B2
(45) Date of Patent: Nov. 18, 2014

(54) GOLF BALL COVER MATERIAL AND GOLF BALL USING THE SAME

(75) Inventors: Kazuyoshi Shiga, Kobe (JP); Toshiyuki Tarao, Kobe (JP); Keiji Ohama, Kobe (JP)

(73) Assignee: SRI Sports Limited, Kobe (JP)

( * ) Notice: Subject to any disclaimer, the term of this patent is extended or adjusted under 35 U.S.C. 154(b) by 595 days.

(21) Appl. No.: 13/210,084

(22) Filed: Aug. 15, 2011

(65) Prior Publication Data

US 2012/0052985 A1   Mar. 1, 2012

(30) Foreign Application Priority Data

Aug. 27, 2010 (JP) ................. 2010-191133

(51) Int. Cl.
| | |
|---|---|
| A63B 37/12 | (2006.01) |
| A63B 37/04 | (2006.01) |
| C08G 18/75 | (2006.01) |
| A63B 37/00 | (2006.01) |
| C08G 18/10 | (2006.01) |
| C08G 18/48 | (2006.01) |

(52) U.S. Cl.
CPC .......... *A63B 37/0023* (2013.01); *C08G 18/758* (2013.01); *C08G 18/10* (2013.01); *C08G 18/4854* (2013.01); *A63B 37/0031* (2013.01); *A63B 37/033* (2013.01)
USPC .......... 473/373; 473/376; 473/378; 524/439; 525/129

(58) Field of Classification Search
USPC .......... 473/365, 370–374, 376–378
See application file for complete search history.

(56) References Cited

U.S. PATENT DOCUMENTS

| | | | |
|---|---|---|---|
| 6,663,510 B1 | 12/2003 | Iwami et al. | |
| 2002/0119839 A1* | 8/2002 | Higuchi et al. | 473/378 |
| 2004/0087754 A1 | 5/2004 | Foley et al. | |
| 2004/0209708 A1* | 10/2004 | Bulpett et al. | 473/378 |
| 2006/0025238 A1* | 2/2006 | Endo et al. | 473/371 |
| 2008/0234068 A1* | 9/2008 | Comeau et al. | 473/377 |
| 2009/0023515 A1* | 1/2009 | Tarao | 473/371 |
| 2009/0124420 A1* | 5/2009 | Kamino et al. | 473/374 |
| 2009/0143169 A1* | 6/2009 | Shiga et al. | 473/378 |

(Continued)

FOREIGN PATENT DOCUMENTS

| | | |
|---|---|---|
| CN | 1708527 A | 12/2005 |
| JP | 2001-95948 A | 4/2001 |
| JP | 2006-34740 A | 2/2006 |

OTHER PUBLICATIONS

English translation of a Japanese Office Action, dated Nov. 12, 2013, for Japanese Application No. 2010-191133.

*Primary Examiner* — Gene Kim
*Assistant Examiner* — John E Simms, Jr.
(74) *Attorney, Agent, or Firm* — Birch, Stewart, Kolasch & Birch, LLP

(57) ABSTRACT

An object of the present invention is to provide a golf ball which has an increased dry spin rate and wet spin rate on approach shots without sacrificing the processability into the cover. The present invention provides a golf ball cover material having shear loss moduli G1" (Pa), G2" (Pa), and G3" (Pa) that satisfy following equations when measured using a dynamic viscoelasticity measuring apparatus at following conditions.

$$\log G1'' \leq 7.09 \quad (1)$$

$$\log G2'' \geq 7.17 \quad (2)$$

$$\log G3'' \leq 7.14 \quad (3)$$

G1" measuring conditions: shear mode, oscillation frequency: 10 Hz, temperature: 0° C., strain: 0.05%;
G2" measuring conditions: shear mode, oscillation frequency: 10 Hz, temperature: −30° C., strain: 0.05%; and
G3" measuring conditions: shear mode, oscillation frequency: 10 Hz, temperature: 0° C., strain: 5%.

16 Claims, 1 Drawing Sheet

(56) References Cited

U.S. PATENT DOCUMENTS

| | | | |
|---|---|---|---|
| 2009/0170634 A1* | 7/2009 | Loper et al. | 473/373 |
| 2010/0125115 A1* | 5/2010 | Wu et al. | 524/386 |
| 2010/0137076 A1 | 6/2010 | Endo et al. | |
| 2010/0216905 A1* | 8/2010 | Kuwamura et al. | 521/170 |

* cited by examiner

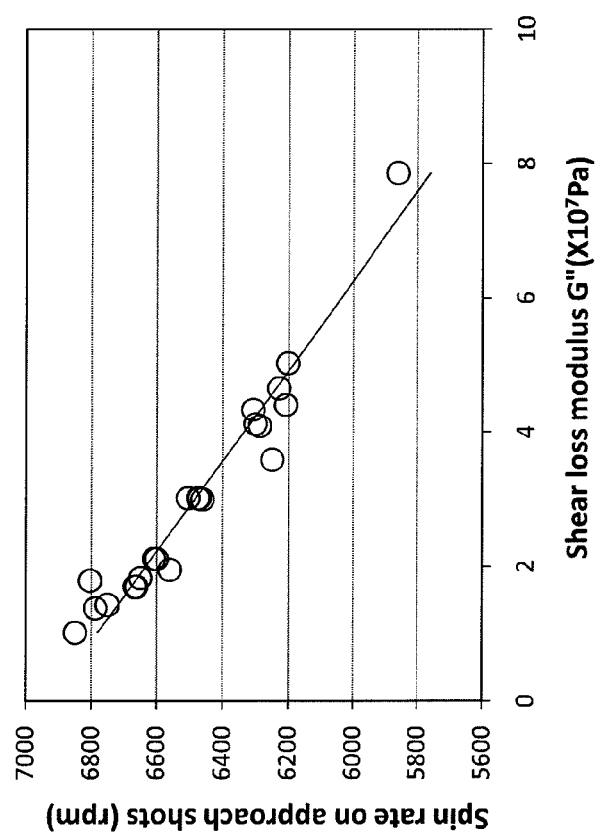

GOLF BALL COVER MATERIAL AND GOLF BALL USING THE SAME

FIELD OF THE INVENTION

The present invention relates to a novel golf ball cover material and a golf ball using the same.

DESCRIPTION OF THE RELATED ART

As a resin component constituting a cover of a golf ball, an ionomer resin or polyurethane is used. Covers containing an ionomer resin are widely used for their excellent repulsion, durability and processability. However, the problems have been pointed out that the shot feeling is poor because of the high rigidity and hardness and that the controllability is also poor because of the insufficient spin performance. On the other hand, if polyurethane is used as the resin component constituting the cover, it is known that the shot feeling and spin performance are improved compared with an ionomer resin.

Since 2010, a new groove regulation has entered in force in a professional golf world on clubs having a loft angle of 25° or more such as irons or wedges. Since this regulation reduces the spin rate on approach shots with irons or wedges, it becomes difficult to stop the golf ball on the green. In order to stop the golf ball on approach shots, a soft cover material was employed to increase the spin rate on approach shots. For example, Japanese Patent Publication No. 2006-034740 A discloses a golf ball comprising a cover having Shore D hardness of 54 or less and containing a thermoplastic polyurethane elastomer as a main component. Japanese Patent Publication No. 2001-95948 A discloses a solid golf ball having a cover composed of a mixture of an ionomer resin, a thermoplastic elastomer and a tackifier, and having Shore D hardness from 40 to 65.

SUMMARY OF THE INVENTION

As described above, the demand for golf balls to stop quickly on approach shots from the fairway and the rough is increasing. The present invention has been achieved in view of the above circumstances. An object of the present invention is to provide a golf ball with an increased dry spin rate and wet spin rate on approach shots. Further, an attempt to increase the spin rate on approach shots by employing conventional soft cover materials causes a problem lowering the processability into the cover, because the cover materials tend to be blocking. Thus, another object of the present invention is to provide a golf ball having an increased dry spin rate and wet spin rate on approach shots without sacrificing the processability into the cover. When hitting approach shots from the rough, since lawn grass exists between the golf ball and the club face, golf balls tend to slip on the club face and it becomes difficult to spin the golf balls. This phenomenon is thought to be similar to the phenomenon that it becomes difficult to spin the golf balls under the wet condition because the golf balls tend to slip on the club face. Accordingly, in the present invention, the spin rate on approach shots under the wet condition is deemed to indicate the spin rate on approach shots from the rough.

The present invention provides a golf ball cover material having shear loss moduli $G1''$ (Pa), $G2''$ (Pa), and $G3''$ (Pa) that satisfy following equations when measured using a dynamic viscoelasticity measuring apparatus at following conditions.

$$\log G1'' \leq 7.09 \quad (1)$$

$$\log G2'' \geq 7.17 \quad (2)$$

$$\log G3'' \leq 7.14 \quad (3)$$

$G1''$ measuring condition: shear mode, oscillation frequency: 10 Hz, temperature: 0° C., strain: 0.05%;
$G2''$ measuring condition: shear mode, oscillation frequency: 10 Hz, temperature: −30° C., strain: 0.05%; and
$G3''$ measuring condition: shear mode, oscillation frequency: 10 Hz, temperature: 0° C., strain: 5%.

With respect to the deformation of the cover when hitting the golf ball, it is considered that the compressive deformation is dominant on driver shots and the shear deformation is dominant on approach shots. Based on this hypothesis, the inventors of the present invention have studied characteristics of the golf ball cover material, and found that the spin rate on approach shots correlates with the shear loss modulus $G''$ measured in a shear mode. FIG. 1 shows a correlation between the spin rate on approach shots and the shear loss modulus $G''$ (measuring conditions: shear mode, oscillation frequency: 10 Hz, temperature: 0° C.) in a golf ball using $H_{12}$MDI-PTMG polyurethane elastomer disclosed in Japanese Patent application No. 2009-285367 previously filed. FIG. 1 shows a good correlation between the spin rate on approach shots and the shear loss modulus $G''$. The spin rate on approach shots increase as the shear loss modulus $G''$ is getting small.

If the golf ball cover material of the present invention has shear loss modulus $G1''$ measured in a shear mode at the conditions of oscillation frequency: 10 Hz, temperature: 0° C., and strain: 0.05%, and satisfying the above equation (1), the dry spin rate on approach shots increases. The present inventors have further studied and accomplished the present invention based on the findings that the wet spin rate on approach shots also increase, if the shear loss moduli $G2''$ (Pa) and $G3''$ (Pa) satisfy the following equations.

$$\log G2'' \geq 7.17 \quad (2)$$

$$\log G3'' \geq 7.14 \quad (3)$$

$G2''$ measuring conditions: shear mode, oscillation frequency: 10 Hz, temperature: −30° C., strain: 0.05%; and
$G3''$ measuring conditions: shear mode, oscillation frequency: 10 Hz, temperature: 0° C., strain: 5%.

According to the present invention, it is possible to provide a golf ball cover material that increases the dry spin rate and wet spin rate on approach shots. In addition, there is no problem of lowering the processability of the cover material into the cover. The golf ball of the present invention produces a high dry spin rate and high wet spin rate on approach shots and thus stops quickly on approach shots from the fairway and the rough.

BRIEF DESCRIPTION OF THE DRAWINGS

FIG. 1 is a graph showing a correlation between the spin rate on approach shots and the shear loss modulus $G''$.

DESCRIPTION OF THE PREFERRED EMBODIMENT

The present invention provides a golf ball cover material having shear loss moduli $G1''$ (Pa), $G2''$(Pa), and $G3''$(Pa) that satisfy following equations when measured using a dynamic viscoelasticity measuring apparatus at following conditions.

$$\log G1'' \leq 7.09 \quad (1)$$

$$\log G2'' \geq 7.17 \quad (2)$$

$$\log G3'' \leq 7.14 \quad (3)$$

G1" measuring conditions: shear mode, oscillation frequency: 10 Hz, temperature: 0° C., strain: 0.05%;
G2" measuring conditions: shear mode, oscillation frequency: 10 Hz, temperature: −30° C., strain: 0.05%; and
G3" measuring conditions: shear mode, oscillation frequency: 10 Hz, temperature: 0° C., strain: 5%.

The inventors of the present invention have considered the mechanism of spinning the golf ball on approach shots as follows and determined the conditions for measuring the shear loss moduli G1" to G3" using a dynamic viscoelasticity measuring apparatus. The multiple grooves having a width of about 0.8 mm and a depth of about 0.4 mm are formed on the surface of the club face of short irons and wedges that are used on approach shots. In addition, there exist micro concavities and convexities (roughness) in several-micron-order level on the club face between these grooves. The measuring condition for the shear loss modulus G1" focuses on the mechanism of the spin produced by the micro concavities and convexities in several-micron-order level on the club face. In measuring the shear loss modulus G1", since the deformation of the cover is relatively small when the golf ball crosses these micro concavities and convexities in several-micron-order level, the strain is set to 0.05%. Further, the reasons of employing the measuring conditions of the oscillation frequency: 10 Hz, and temperature: 0° C. are as follows. The contact time between the golf ball and the golf club when hitting the golf ball is several hundreds micro seconds. If this impact is considered as one deformation, this deformation corresponds to the deformation at the frequency of several thousands Hertz. Based on the time-temperature superposition principle of the general polyurethane elastomer, the viscoelasticity measured at the conditions of temperature: room temperature and oscillation frequency: several thousands Hertz correspond to the viscoelasticity measured at the conditions of temperature: 0° C. and oscillation frequency: 10 Hz.

The measuring conditions for the shear loss moduli G2" and G3" focus on the mechanism of the spin produced when the golf ball slides on the face while crossing the concavities and convexities in several-micron-order level on the club face and are gripped by the grooves formed on the club face. That is, the spin rate is affected by both the concavities and convexities in several-micron-order level on the club face and the grooves of the face.

With respect to the shear loss modulus G2", the affect of the spin produced when the golf ball crosses the concavities and convexities in several-micron-order level is considered in detail. Since the deformation of the cover is relatively small when the golf ball crosses these micro concavities and convexities in several-micron-order level, the strain is set to 0.05%. Further, the reasons of employing the measuring conditions of the oscillation frequency: 10 Hz, and temperature: −30° C. are as follows. The frequency of the deformation when the golf ball crosses the concavities and convexities in several-micron-order level on the club face is in $10^7$ Hz order. Based on the time-temperature superposition principle of the general polyurethane elastomer, the viscoelasticity measured at the conditions of temperature: room temperature and oscillation frequency: $10^7$ Hertz correspond to the viscoelasticity measured at the conditions of temperature: −30° C. and oscillation frequency: 10 Hz.

The shear loss modulus G3" focuses on the spin produced when the golf ball are gripped by the grooves of the club face. Taking it into consideration that the deformation of the cover is relatively large, the strain is set to 5%. The reasons of employing the measuring conditions of the oscillation frequency: 10 Hz, and temperature: 0° C. are the same reasons for the shear loss modulus G1".

The golf ball cover material of the present invention has the shear loss modulus G1", which is measured using a dynamic viscoelasticity measuring apparatus at the following conditions and satisfies the following equation (1).

$$\log G1'' \leq 7.09 \quad (1)$$

G1" measuring conditions: shear mode, oscillation frequency: 10 Hz, temperature: 0° C., strain: 0.05%;

If log G1" is 7.09 or less, the dry spin rate on approach shots increases. From this aspect, log G1" is preferably 7.07 or less, more preferably 7.03 or less. The lower limit of log G1" is, without any specific limitation, preferably 6.00, more preferably 6.04.

The golf ball cover material of the present invention has the shear loss modulus G2", which is measured using a dynamic viscoelasticity measuring apparatus at the following conditions and satisfies the following equation (2).

$$\log G2'' \geq 7.17 \quad (2)$$

G2" measuring conditions: shear mode, oscillation frequency: 10 Hz, temperature: −30° C., strain: 0.05%; and If log G2" is 7.17 or more, the wet spin rate on approach shots increases. From this aspect, log G2" is preferably 7.28 or more, more preferably 7.36 or more. If log G2" is too high, the shot feeling deteriorates. Thus, log G2" is preferably 8.5 or less, more preferably 8.4 or less.

The golf ball cover material of the present invention has the shear loss modulus G3", which is measured using a dynamic viscoelasticity measuring apparatus at the following conditions and satisfies the following equation (3).

$$\log G3'' \leq 7.14 \quad (3)$$

G3" measuring conditions: shear mode, oscillation frequency: 10 Hz, temperature: 0° C., strain: 5%.

If log G3" is 7.14 or less, the wet spin rate on approach shots increases. From this aspect, log G3" is preferably 7.09 or less, more preferably 6.94 or less. If log G3" is too small, the handling becomes poor during the production step. Thus, log G3" is preferably 6.00 or more, more preferably 6.04 or more. In general, if the material is designed to have a large shear loss modulus G2", the shear loss modulus G3" also becomes large. The lager shear loss modulus G3" reduces the wet spin rate on approach shots. Thus, in the present invention, the wet spin rate is increased by making the value of the shear loss modulus G3" a constant value or less.

The shear loss moduli G1" to G3" can be controlled by appropriately adjusting the ratios or molecular weights of the respective components constituting the polyurethane contained in the golf ball cover material.

The golf ball cover material of the present invention preferably contains polyurethane as a resin component. The polyurethane is a polymer having plurality of urethane bonds in a molecular chain thereof and is obtained by, for example, a reaction between a polyol and a polyisocyanate.

As a polyol component constituting the polyurethane, preferably used is a polyol having a number average molecular weight ranging from 650 to 1,700. Use of the cover material containing polyurethane with a polyol component having a number average molecular weight in the above range provides a golf ball where the spin rate does not change significantly on driver shots, but the spin rate changes on approach shots. As a result, the golf ball producing a low spin rate on driver shots while producing a high spin rate on approach shots is obtained. The number average molecular weight of the polyol is preferably 850 or more, and more preferably 1,000 or more. If the number average molecular weight of the polyol is too small, the obtained polyurethane may become hard. The number average molecular weight of the polyol is preferably 1,500 or less, and more preferably 1,400 or less. If the number average molecular weight of the polyol component is small, the ratio of the increase in the spin rate on the driver shots to the increase in the spin rate on the approach shots becomes small.

The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The polyol component having a number average molecular weight from 650 to 1,700 is preferably a polymer polyol. The polymer polyol is a polymer obtained by polymerizing a low molecular compound, and has plurality of hydroxyl groups. Among them, a polymer diol having two hydroxyl groups is more preferable. Use of the polymer diol provides a linear thermoplastic polyurethane and facilitates the molding of the obtained polyurethane into the constituting member of the golf ball.

Examples of the polyol having a number average molecular weight from 650 to 1,700 include a polyether polyol such as polyoxyethylene glycol (PEG), polyoxypropylene glycol (PPG), and polytetramethylene ether glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. Among them, as the polyol component, polytetramethylene ether glycol is preferably used. Use of the polytetramethylene ether glycol makes it possible to control the spin rates on driver shots and approach shots at the higher level.

The polymer polyol constituting the polyurethane used in the present invention preferably has a hydroxyl value of 561 mgKOH/g or less, more preferably 173 mgKOH/g or less and preferably has a hydroxyl value of 94 mgKOH/g or more, more preferably 112 mgKOH/g or more, even more preferably 132 mgKOH/g or more. The hydroxyl value of the polyol component can be measured, for example, by an acetylation method according to JIS K1557-1.

The polyurethane preferably used in the present invention may further have a chain extender as a constituent, unless the effect of the preset invention does not deteriorate. The chain extender includes a low-molecular weight polyol or a low-molecular weight polyamine. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, and 1,4-cyclohexane dimethylol; a triol such as glycerin, trimethylol propane, and hexanetriol; a tetraol or a hexanol such as pentaerythritol and sorbitol.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The chain extender preferably has a molecular weight of 400 or less, more preferably 350 or less, even more preferably less than 200 and preferably has a molecular weight of 30 or more, more preferably 40 or more, even more preferably 45 or more. If the molecular weight is too large, it is difficult to distinguish the chain extender from the high-molecular weight polyol (polymer polyol) constituting a soft segment of the polyurethane. "Low molecular weight polyol" and "Low molecular weight polyamine" are low molecular compounds which do not have a molecular weight distribution, and are distinguished from the polymer polyol having a number average molecular weight from 650 to 1,700 obtained by polymerization of the low molecular weight compound.

The polyisocyanate component constituting the polyurethane preferably used in the present invention is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the polyurethane. Use of the aromatic polyisocyanate improves the mechanical property of the obtained polyurethane and provides the cover with the excellent abrasion-resistance. In addition, in view of improving the weather resistance, as the polyisocyanate component of the polyurethane, a non-yellowing type polyisocyanate such as TMXDI, XDI, HDI, $H_6$XDI, IPDI, $H_{12}$MDI and NBDI is preferably used. More preferably, 4,4'-dicyclohexylmethane diisocyanate ($H_{12}$MDI) is used. Since 4,4'-dicyclohexylmethane diisocyanate ($H_{12}$MDI) has a rigid structure, the mechanical property of the resulting polyurethane is improved, and thus the cover which is excellent in abrasion-resistance can be obtained.

The polyurethane used in the present invention has no limitation on the constitutional embodiments thereof. Examples of the constitutional embodiments are the embodiment where the polyurethane consists of the polyisocyanate component, and the polymer polyol component (preferably the polymer polyol component having a number average molecular weight from 650 to 1,700), and the embodiment where the polyurethane consists of the polyisocyanate component, the polymer polyol component (preferably the polymer polyol component having a number average molecular weight from 650 to 1,700), and the chain extender component.

The polyurethane preferably used in the present invention preferably has dicyclohexylmethane diisocyanate as the polyisocyanate component, polytetramethylene ether glycol having a number average molecular weight from 650 to 1,700 as the polyol component, more preferably further has 1,4-butane diol as the chain extender component.

The polyurethane preferably used in the present invention may be either a thermoplastic polyurethane or a thermosetting polyurethane (two-component curing type polyurethane). The thermoplastic polyurethane is polyurethane exhibiting plasticity by heating and generally means a polyurethane having a linear chain structure of a high molecular weight to a certain extent. On the other hand, the thermosetting polyurethane (two-component curing type polyurethane) is a polyurethane obtained by polymerization through a reaction between a relatively low-molecular weight urethane prepolymer and a chain extender (curing agent). The thermosetting polyurethane includes polyurethane having a linear chain structure or polyurethane having a three-dimensional crosslinked structure depending on a number of a functional group of the prepolymer or the chain extender (curing agent) to be used. In the present invention, the thermoplastic polyurethane is preferable.

Examples of a method for synthesizing the polyurethane include a one-shot method and a prepolymer method. The one-shot method is a method of reacting a polyisocyanate component, a polyol component or the like at once. The prepolymer method is a method of reacting a polyisocyanate component and a polyol component or the like in multiple steps. For example, a relatively low-molecular weight urethane prepolymer is synthesized, followed by further polymerization to have a higher-molecular weight. The polyurethane used in the present invention is preferably produced by the prepolymer method.

As an example of producing the polyurethane by the prepolymer method, the following case will be described in detail, wherein an isocyanate group terminated urethane prepolymer is synthesized and then polymerized with the chain extender.

First, a polyisocyanate component is allowed to react with a polymer polyol component to synthesize an isocyanate group terminated urethane prepolymer. In this case, the charging ratio of the polyisocyanate component to the polymer polyol component is, preferably 1 or larger, more preferably 1.2 or larger, and even more preferably 1.5 or larger, and is preferably 10 or smaller, more preferably 9 or smaller, and even more preferably 8 or smaller in a molar ratio (NCO/OH) of the isocyanate group (NCO) contained in the polyisocyanate component to the hydroxyl group (OH) contained in the polyol component.

The temperature at which the prepolymer reaction is performed is preferably 10° C. or higher, more preferably 30° C. or higher, and even more preferably 50° C. or higher, and is preferably 200° C. or lower, more preferably 150° C. or lower, and even more preferably 100° C. or lower. The reaction time for the prepolymer reaction is preferably 10 minutes or longer, more preferably 1 hour or longer, and even more preferably 3 hours or longer, and is preferably 32 hours or shorter, more preferably 16 hours or shorter, and even more preferably 8 hours or shorter.

Next, the obtained isocyanate group terminated urethane prepolymer is subjected to a chain extension reaction with the chain extender component to obtain the polyurethane having a high molecular weight. In this case, the charging ratio of the isocyanate group terminated urethane prepolymer to the chain extender component is preferably 0.9 or larger, more preferably 0.92 or larger, and even more preferably 0.95 or larger, and is preferably 1.1 or smaller, more preferably 1.08 or smaller, and even more preferably 1.05 or smaller in a molar ratio (NCO/OH) of the isocyanate group (NCO) contained in the isocyanate group terminated urethane prepolymer to the hydroxyl group (OH) contained in the chain extender component.

The temperature at which the chain extension reaction is performed is preferably 10° C. or higher, more preferably 30° C. or higher, and even more preferably 50° C. or higher, and is preferably 220° C. or lower, more preferably 170° C. or lower, and even more preferably 120° C. or lower. The reaction time for the chain extension reaction is preferably 10 minutes or longer, more preferably 30 minutes or longer, and even more preferably 1 hour or longer, and is preferably 20 days or shorter, more preferably 10 days or shorter, and even more preferably 5 days or shorter.

Both of the prepolymer reaction and the chain extension reaction are preferably conducted in an atmosphere of dry nitrogen.

In synthesizing the polyurethane, a publicly known catalyst may be used as long as it does not impair the effect of the present invention. Examples of the catalyst include a monoamine such as triethylamine, and N,N-dimethylcyclohexylamine; a polyamine such as N,N,N',N'-tetramethylethylenediamine, and N,N,N',N'',N''-pentamethyldiethylenetriamine; a cyclic diamine such as 1,8-diazabicyclo-[5.4.0]-7-undecene (DBU), triethylenediamine; a tin-based catalyst such as dibutyl tin dilaurylate, and dibutyl tin diacetate. Each of these catalysts may be used solely, or two or more of these catalysts may be used in combination. Among these catalysts, a tin-based catalyst such as dibutyl tin dilaurylate, and dibutyl tin diacetate are preferable, and in particular, dibutyl tin dilaurylate is preferably used.

The golf ball cover material of the present invention preferably contains only the polyurethane as the resin composition, but may further contain ionomer resins or thermoplastic elastomers, as long as they do not impair the effect of the present invention. In this case, the content of the polyurethane is preferably 50 mass % or more, more preferably 60 mass % or more, even more preferably 70 mass or more in the resin component.

Examples of the ionomer resin include one prepared by neutralizing at least a part of carboxyl groups in a copolymer, composed of ethylene and α,β-unsaturated carboxylic acid having 3 to 8 carbon atoms with a metal ion; one prepared by neutralizing at least a part of carboxyl groups in a terpolymer composed of ethylene, α,β-unsaturated carboxylic acid having 3 to 8 carbon atoms, and α,β-unsaturated carboxylic acid ester with a metal ion; or a mixture of these two. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the metal ion for neutralizing at least a part of the carboxyl groups in the copolymer composed of ethylene and the α,β-unsaturated carboxylic acid or in the terpolymer composed of ethylene, the α,β-unsaturated carboxylic acid, and the α,β-unsaturated carboxylic acid ester are; monovalent metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

Specific examples of the ionomer resin include "Himilan (registered trade mark)" available from MITSUI-DUPONT POLYCHEMICAL CO., LTD, "Surlyn (registered trade mark)" available from DUPONT CO, and "Iotek (registered trade mark)" available from Exxon Co.

Specific examples of the thermoplastic elastomers are a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation. The ionomer resins and the thermoplastic elastomers can be used solely or as a mixture of at least two of them. The golf ball cover material of the present invention may contain a pigment component such as a white pigment (for example, titanium oxide) and a blue pigment, a gravity adjusting agent such as calcium carbonate and barium sulfate, a dispersant, an antioxidant, an ultraviolet absorber, a light stabilizer, a fluorescent material or a fluorescent brightener.

The content of the white pigment (for example, titanium oxide) is preferably 0.5 part by mass or more, more preferably 1 part by mass or more, and is preferably 10 parts by mass or less, more preferably 8 parts by mass or less based on 100 parts by mass of the resin component. The white pigment in an amount of 0.5 part by mass or more can impart opacity to the cover, while the white pigment in an amount of more than 10 parts by mass may lower the durability of the cover.

The golf ball cover material of the present invention preferably has hardness of 74 or more, more preferably 75 or more, even more preferably 76 or more, and preferably has hardness of 99 or less, more preferably 98 or less, even more preferably 97 or less, in JIS-A hardness. If the JIS-A hardness is too low, the cover material tends to be blocking. If the JIS-A hardness is too high, the spin rate on approach shots may decrease excessively. The JIS-A hardness of the cover material is a slab hardness by measuring the cover composition that is molded into in a sheet form, and is measured by a later-described measuring method.

The golf ball of the present invention is not limited, as long as it comprises a core and a cover covering the core, wherein the cover is formed from the golf ball cover material of the present invention. Examples include a two-piece golf ball comprising a single-layered core and a cover disposed around the core; a three-piece golf ball comprising a core having a center and a single-layered intermediate layer disposed around the center, and a cover disposed around the core, and a multi-piece golf ball comprising a core having a center and at least two intermediate layer disposed around the center, and a cover disposed around the core.

The cover of the golf ball of the present invention is formed from the golf ball cover material of the present invention (hereinafter, sometimes merely referred to as "cover composition"). A method for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the present invention, molding the cover by injection molding the cover composition directly on the core is also preferable. In this case, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 250° C. is charged into a mold held under the pressure of 9 MPa to 15 MPa for 0.5 second to 5 seconds. After cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

In the present invention, the thickness of the cover of the golf ball is preferably 2.0 mm or less, more preferably 1.5 mm or less, even more preferably 1.0 mm or less. If the thickness of the cover is 2.0 mm or less, since it is possible to increase the diameter of the core, the resilience of the obtained golf ball is improved. The thickness of the cover is not limited, but is preferably 0.3 mm or more, more preferably 0.4 mm or more, and even more preferably 0.5 mm or more. If the thickness of the cover is less than 0.3 mm, it may become difficult to mold the cover.

Next, a preferred embodiment of the core of the golf ball of the present invention will be explained. The core of the golf ball of the present invention includes, for example, a single-layered core, and a core consisting of a center and at least one intermediate layer covering the center. The core consisting of a center and at least one intermediate layer covering the center includes, for example, a core consisting of a center and a single-layered intermediate layer covering the center; and a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed as a part of the center in an integrated manner on the surface of the center, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core or the center of the golf ball of the present invention, is preferably molded by, for example, heat-pressing a rubber composition (hereinafter, sometimes simply referred to as "core rubber composition") containing a base rubber, a crosslinking initiator, a co-crosslinking agent, and where necessary a filler.

As the base rubber, a natural rubber or a synthetic rubber can be used. Such examples include a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of the co-crosslinking agent needs to be increased in order to obtain an appropriate hardness, which may cause the insufficient resilience.

The co-crosslinking agent is not particularly limited, as long as it has the effect of crosslinking a rubber molecule by graft polymerization to a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide; a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl) disulfide are preferably used, since a golf ball having particularly high resilience can be obtained. The amount of the organic sulfur compound to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the core rubber composition may be determined appropriately depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core used in the golf ball of the present invention preferably has a diameter of 38 mm or larger, more preferably 39.0 mm or larger, and even more preferably 40.8 mm or larger, and preferably has a diameter of 42.2 mm or smaller, more preferably 42 mm or smaller, and even more preferably 41.8 mm or smaller. If the diameter of the core is smaller than the above lower limit, the cover becomes so thick that the resulting golf ball would have reduced resilience. On the other hand, if the diameter of the core is larger than the above upper limit, the cover becomes so thin that it is difficult to mold a cover.

In the case that the core has a diameter ranging from 38 mm to 42.2 mm, the compression deformation amount (shrinking amount of the core in a compressive direction) of the core when applying a load from 98 N as an initial load to 1275 N as a final load is preferably 2.40 mm or more, more preferably 2.50 mm or more, even more preferably 2.60 mm or more, and is preferably 3.20 mm or less, and more preferably 3.10 mm or less. If the above deformation amount is less than 2.40 mm, the shot feeling becomes poor, while if the above deformation amount is larger than 3.20 mm, the repulsion property may be lowered.

In a preferable embodiment, the core has a hardness difference between the center and the surface. The difference between the surface hardness and the center hardness is preferably 10 or more, more preferably 12 or more, and is preferably 40 or less, more preferably 35 or less, and even more preferably 30 or less in JIS-C hardness. If the hardness difference is more than 40, the durability may be lowered, while if the hardness difference is less than 10, the shot feeling may be hard because of a large impact. The surface hardness of the core is preferably 65 or more, more preferably 70 or more, even more preferably 72 or more, and is preferably 100 or less in JIS-C hardness. If the surface hardness of the core is less than 65 in JIS-C hardness, the core is so soft and the repulsion property may be lowered, resulting in the short flight distance. On the other hand, if the surface hardness of the core is more than 100, the core is so hard and the shot feeling may deteriorate. The center hardness of the core is preferably 45 or more, more preferably 50 or more, and is preferably 70 or less, and more preferably 65 or less in JIS-C hardness. If the center hardness of the core is less than 45, the core is so soft and the durability may be lowered, while if the center hardness of the core is more than 70, the core is so hard and the shot feeling may be worsened. The hardness difference of the core can be provided by forming an intermediate layer having a higher hardness than that of the center or by properly selecting the heat molding conditions of the core. The center hardness of the core means a JIS-C hardness obtained by cutting a spherical core into halves and measuring at the central point of the cut surface using a JIS-C type spring hardness tester. The surface hardness means a hardness measured at a surface part of the core using a JIS-C type spring hardness tester. In the case that the core has a multi-layered structure, the surface hardness of the core means the hardness measured at the surface of the outermost layer of the core.

In the case that the core consists of a center and at least one intermediate layer covering the center, the center can be formed from the core rubber composition described above. The diameter of the center is preferably 30 mm or more, more preferably 32 mm or more, and is preferably 41 mm or less, more preferably 40.5 mm or less. If the diameter of the center is less than 30 mm, the intermediate layer or the cover layer must be made thicker than the desired thickness, resulting in the lowered resilience. On the other hand, if the diameter of the center is more than 41 mm, the intermediate layer or the cover must be made thinner than the desired thickness, and hence the intermediate layer or the cover does not function well.

Examples of the material for the intermediate layer are a cured product of a rubber composition, an ionomer resin, a thermoplastic polyamide elastomer having a commercial name of "Pebax (registered trademark) (e.g. Pebax 2533)" available from Arkema; a thermoplastic polyester elastomer having a commercial name of "Hytrel (registered trademark) (e.g. Hytrel 3548, Hytrel 4047)" available from Du Pont-Toray Co., Ltd.; a thermoplastic polyurethane elastomer having a commercial name of "Elastollan (registered trademark) (e.g. Elastollan XNY97A)" available from BASF Japan Co., and a thermoplastic polystyrene elastomer having a commercial name of "Rabalon (registered trademark) (e.g. Rabalon SR04, Rabalon T3339C, Rabalon T3221C)" available from Mitsubishi Chemical Corporation. The above materials for the intermediate layer can be used solely or as a mixture of at least two of them.

Examples of the ionomer resin include one prepared by neutralizing at least a part of carboxyl groups in a copolymer, composed of ethylene and α,β-unsaturated carboxylic acid having 3 to 8 carbon atoms with a metal ion; one prepared by neutralizing at least a part of carboxyl groups in a terpolymer composed of ethylene, α,β-unsaturated carboxylic acid having 3 to 8 carbons atoms, and α,β-unsaturated carboxylic acid ester with a metal ion; or a mixture of these two.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM7311 (Mg), Himilan AM7329(Zn); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 6320 (Mg), Surlyn 8120 (Na), Surlyn 8320 (Na), Surlyn 9320 (Zn))" and the ternary copolymerized ionomer such as "HPF 1000 (Mg), HPF 2000 (Mg)" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins. The intermediate layer may further contain a specific gravity adjusting agent such as barium sulfate or tungsten or the like; an antioxidant; or a pigment component.

In the case of using the intermediate layer composition containing a rubber composition as a main component (50 mass % or more), the intermediate layer preferably has a thickness of 1.2 mm or more, more preferably 1.8 mm or more, even more preferably 2.4 mm or more, and preferably has a thickness of 6.0 mm or less, more preferably 5.2 mm or less, even more preferably 4.4 mm or less.

In the case of using the intermediate layer composition containing the resin composition as a main component (50 mass % or more), the intermediate layer preferably has a thickness of 0.3 mm or more, more preferably 0.4 mm or more, even more preferably 0.5 mm or more, and preferably has a thickness of 2.5 mm or less, more preferably 2.4 mm or less, even more preferably 2.3 mm or less. If the thickness of the intermediate layer is more than 2.5 mm, the resilience performance of the obtained golf ball may be lowered, while if the thickness of the intermediate layer is less than 0.3 mm, it may be difficult to suppress the excessive spin rate on driver shots.

A method for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow-shells to the compression-molding.

The intermediate layer of the golf ball of the present invention preferably has a slab hardness of 40 or larger, more preferably 45 or larger, and even more preferably 50 or larger, and preferably has a slab hardness of 80 or smaller, more preferably 70 or smaller, and even more preferably 65 or smaller in Shore D hardness. The intermediate layer having the slab hardness of 40 or more in shore D hardness makes the core have the higher degree of "outer-hard and inner-soft" structure, thereby providing a high launch angle and a less amount of spin and hence achieving a great flight distance of the gold ball. On the other hand, the intermediate layer having the slab hardness of 80 or less in shore D hardness provides an excellent shot feeling as well as improves the spin performance of the golf ball, thereby improving controllability of the golf ball. Herein, the slab hardness of the intermediate layer is the measured hardness of the intermediate layer composition that is molded into a sheet form, and is measured by a later-described measuring method. The slab hardness of the intermediate layer can be adjusted, for example, by appropriately selecting a combination of the above resin components and the rubber material and the amount of additives.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]
(1) Shear Loss Modulus G1" to G3"

The shear loss moduli G1" to G3" of the cover material were measured at the following conditions.
Apparatus: Rheometer ARES available from TA instruments
Test piece: A sheet having a thickness of 2 mm was produced from a cover material by a press molding and a test piece was cut out to have a width 10 mm and a length between the clamps of 10 mm.
Measuring mode: shear mode
Measuring temp.: 0° C., −30° C.
Oscillation frequency: 10 Hz
Measuring strain: 0.05%, 5%
It is noted that the shear loss modulus of the cover material is the shear loss modulus of the cover material where 4 parts by mass of titanium oxide was blended to 100 parts by mass of the resin component.

(2) Spin Rate on Approach Shots (Dry Spin Rate, Wet Spin Rate, Spin Retention)

An approach wedge (SRIXON I-302 (new groove regulation passed), Shaft S available from SRI Sports Limited) was installed on a swing robot available from Golf Laboratories, Inc. A golf ball was hit at a head speed of 21 m/sec., and a sequence of photographs of the hit golf ball were taken for measuring the spin rate (rpm). The measurement was performed ten times for each golf ball, and the average value is regarded as the spin rate (rpm). "Dry spin rate" means a spin rate when the test was conducted under the condition that the club face and the golf ball were dry, and "Wet spin rate" means a spin rate when the test was conducted under the condition that the club face and the golf ball were wet with water. Spin retention can be calculated by the following mathematical expression.

Spin retention(%)=100×Wet spin rate/Dry spin rate

Criteria of Dry Spin Performance
G(Good): Spin rate 6,600 rpm or more
P(Poor): Spin rate less than 6,600 rpm
Criteria of Wet Spin Performance
G(Good): Spin rate 4,700 rpm or more
P(Poor): Spin rate less than 4,700 rpm
(3) Slab Hardness (Shore D Hardness)

Sheets having a thickness of about 2 mm were prepared from the cover material or the intermediate layer composition by hot press molding and preserved at the temperature of 23° C. for two weeks. Three or more of the sheets were stacked on one another to avoid being affected by the measuring substrate on which the sheets were placed, and the stack was subjected to the measurement using a P1 type auto hardness tester provided with the Shore D type spring hardness tester prescribed by ASTM-D2240, available from KOUBUNSHI KEIKI CO., LTD to obtain the respective slab hardness of the cover material or the intermediate layer composition.

It is noted that the slab hardness of the cover material is the slab hardness of the cover material where 4 parts by mass of titanium oxide was blended to 100 parts by mass of the resin component.

(4) Core Hardness (JIS-C)

The hardness measured at a surface part of a spherical core using a P1 type auto hardness tester provided with the JIS-C type spring hardness tester available from KOUBUNSHI KEIKI CO., LTD, was determined as the surface hardness of the spherical core, and the JIS-C hardness obtained by cutting a spherical core into halves and measuring at the central point of the cut surface was determined as the center hardness of the spherical core.

(5) Number Average Molecular Weight of Polyol Component

Gel permeation chromatography was conducted to determine the number average molecular weight of the polyol component under the following conditions.
Measuring Conditions:
Apparatus: HLC-8120GPC manufactured by Tosoh Corporation
Eluent: THF
Temperature: 40° C.
Column: TSK gel Super HM-M (manufactured by Tosho Corporation)
Polyol concentration: 0.2 mass % (Polyol/(polyol+THF))
Sample injection volume: 5 ul
Flow rate: 0.5 ml/min
Molecular weight standard: polystyrene (PSt Quick Kit-H, manufactured by Tosoh Corporation).
[Production of the Golf Ball]
(1) Preparation of the Center The center rubber composition having a formulation shown in Table 1 was kneaded and pressed in upper and lower molds, each having a hemispherical cavity, at a temperature of 170° C. for 15 minutes to obtain the center in a spherical shape (diameter 38.5 mm).

TABLE 1

| Center rubber composition | A |
| --- | --- |
| Polybutadiene rubber | 100 |
| Zinc acrylate | 38 |
| Zinc oxide | 5 |

TABLE 1-continued

| Center rubber composition | A |
| --- | --- |
| Diphenyl disulfide | 0.5 |
| Dicumyl peroxide | 1 |

Notes on table 1:
Parts by mass
Polybutadiene rubber: "BR730 (high cis-polybutadiene)" manufactured by JSR Corporation
Zinc acrylate: "ZNDA-90S" manufactured by NIHON JYORYU KOGYO Co,. LTD.
Zinc oxide: "Ginrei R" manufactured by Toho-Zinc Co.
Diphenyl disulfide: manufactured by Sumitomo Seika Chemicals Company Limited
Dicumyl peroxide: "Percumyl D" manufactured by NOF Corporation (2) Preparation of Core Next, the materials for the intermediate layer shown in Table 2 were extruded by a twin-screw kneading extruder to prepare an intermediate layer composition in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. The obtained intermediate layer composition was injection molded on the center which had been obtained as described above, to prepare a core (diameter 41.7 mm) consisting of the center and the intermediate layer covering the center.

TABLE 2

| Core No. | | 1 |
| --- | --- | --- |
| Center | Center composition | A |
|  | Center diameter (mm) | 38.5 |
| Intermediate layer | Intermediate layer composition | a |
|  | Himilan 1605 | 50 |
|  | Himilan AM7329 | 50 |
|  | Slab hardness (Shore D) | 64 |
|  | Thickness (mm) | 1.6 |
| Core Property | Diameter (mm) | 41.7 |
|  | Surface hardness (JIS-C) | 98 |
|  | Center hardness (JIS-C) | 65 |
|  | Hardness difference (JIS-C) | 33 |
|  | Compression deformation amount (mm) | 2.55 |

Formulation: parts by mass
Notes on table 2:
Himilan 1605: sodium ion neutralized ethylene-methacrylic acid copolymerized ionomer resin manufactured by MITSUI-DUPONT POLYCHEMICAL CO., LTD.
Himilan AM7329: zinc ion neutralized ethylene-methacrylic acid copolymerized ionomer resin manufactured by MITSUI-DUPONT POLYCHEMICAL CO., LTD.

(3) Synthesis of Polyurethane

Polyurethanes having the compositions shown in Tables 3 to 4 were synthesized as follows. First, polytetramethylene ether glycol (PTMG) heated at the temperature of 80° C. was added to dicyclohexylmethane diisocyanate ($H_{12}$MDI) heated at the temperature of 80° C. Then, dibutyl tin dilaurate (dibutyl tin dilaurate available from Aldrich, Inc.) of 0.005 mass % of the total amount of the raw materials ($H_{12}$MDI, PTMG, and BD) was added thereto. Then, the mixture was stirred at the temperature of 80° C. for 2 hours under a nitrogen gas flow. Under a nitrogen gas flow, butane diol (BD) heated at the temperature of 80° C. was added as a chain extender to the mixture, and the mixture was stirred at the temperature of 80° C. for 1 minute. Then, the reaction liquid was cooled, and degassed under the reduced pressure for 1 minute at the room temperature. After the degassing, the reaction liquid was spread in a container, kept at the temperature of 110° C. for 6 hours under a nitrogen gas atmosphere to carry out a chain extending reaction, thereby obtaining polyurethanes.

(4) Molding of Half Shells

The polyurethane thus obtained were dry blended with titanium oxide, and mixed by a twin-screw kneading extruder to prepare cover compositions in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

(5) Molding of the Cover

The core obtained in (2) was covered with the two half shells obtained in (4) in a concentric manner, and the cover was molded by compression molding. Compression molding was performed at a temperature of 145° C. for 2 minutes under a molding pressure of 9.8 MPa.

The surface of the obtained golf ball body was subjected to a sandblast treatment, and marking, and then clear paint was applied thereto and dried in an oven at a temperature of 40° C. to obtain a golf ball having a diameter of 42.7 mm and a weight of 45.3 g. The spin performance of the obtained golf ball was evaluated, and results thereof are also shown in Tables 3 and 4.

TABLE 3

| | | Golf ball No. | 1 | 2 | 3 | 4 | 5 | 6 | 7 | 8 | 9 | 10 |
|---|---|---|---|---|---|---|---|---|---|---|---|---|
| Cover compo- sition | Polyure- thane comp. (molar ratio) | PTMG 650 | 1 | 1 | 1 | 1 | 1 | — | — | — | — | — |
| | | PTMG 1000 | — | — | — | — | — | 1 | 1 | 1 | 1 | 1 |
| | | PTMG 1400 | — | — | — | — | — | — | — | — | — | — |
| | | PTMG 1700 | — | — | — | — | — | — | — | — | — | — |
| | | $H_{12}$MDI | 2.05 | 1.96 | 1.78 | 1.66 | 1.51 | 3.21 | 3.07 | 2.58 | 2.09 | 1.81 |
| | | BD (Butane diol) | 1.05 | 0.96 | 0.78 | 0.66 | 0.51 | 2.21 | 2.07 | 1.58 | 1.09 | 0.81 |
| | | Slab hardness (JIS-A) | 73 | 70 | 62 | 60 | 55 | 84 | 82 | 75 | 68 | 64 |
| | | Log G1" | 6.98 | 6.91 | 6.66 | 6.47 | 6.38 | 7.07 | 6.98 | 6.75 | 6.58 | 6.50 |
| | | Log G2" | 7.45 | 7.44 | 7.41 | 7.39 | 7.38 | 7.45 | 7.44 | 7.41 | 7.39 | 7.38 |
| | | Log G3" | 6.63 | 6.57 | 6.33 | 6.15 | 6.06 | 6.84 | 6.75 | 6.53 | 6.36 | 6.28 |
| | Processability | | NG | NG | NG | NG | NG | Good | Good | Good | NG | NG |
| Ball Prop- erties | Cover thickness (mm) | | 0.5 | 0.5 | 0.5 | 0.5 | 0.5 | 0.5 | 0.5 | 0.5 | 0.5 | 0.5 |
| | Dry spin rate on Approach shots (rpm) | | 6722 | 6798 | 7102 | 7330 | 7450 | 6603 | 6720 | 6995 | 7201 | 7302 |
| | Wet spin rate on Approach shots (rpm) | | 4710 | 5255 | 5758 | 5320 | 4702 | 4702 | 5310 | 5775 | 5251 | 4720 |
| | Spin retention (wet/dry) % | | 70 | 77 | 81 | 73 | 63 | 71 | 79 | 83 | 73 | 65 |
| | Dry Approach Performance | | G | G | G | G | G | G | G | G | G | G |
| | Wet Approach Performance | | G | G | G | G | G | G | G | G | G | G |

Cover material: polyurethane 100 parts, titanium oxide 4 parts

TABLE 4

| | | Golf ball No. | 11 | 12 | 13 | 14 | 15 | 16 | 17 | 18 | 19 | 20 | 21 |
|---|---|---|---|---|---|---|---|---|---|---|---|---|---|
| Cover compo- sition | Polyure- thane comp. (molar ratio) | PTMG 650 | — | — | — | — | — | — | — | — | — | — | — |
| | | PTMG 1000 | — | — | — | — | — | — | — | — | — | — | — |
| | | PTMG 1400 | 1 | 1 | 1 | 1 | 1 | 1 | — | — | — | — | — |
| | | PTMG 1700 | — | — | — | — | — | — | 1 | 1 | 1 | 1 | 1 |
| | | $H_{12}$MDI | 5.06 | 4.58 | 4.12 | 3.81 | 3.04 | 2.66 | 6.18 | 5.44 | 4.91 | 4.70 | 4.07 |
| | | BD (Butane diol) | 4.06 | 3.58 | 3.12 | 2.81 | 2.04 | 1.66 | 5.18 | 4.44 | 3.91 | 3.70 | 3.07 |
| | | Slab hardness (JIS-A) | 95 | 90 | 87 | 82 | 74 | 70 | 97 | 90 | 85 | 83 | 77 |
| | | Log G1" | 7.28 | 7.24 | 7.03 | 6.82 | 6.70 | 6.62 | 7.21 | 7.09 | 6.93 | 6.79 | 6.57 |
| | | Log G2" | 7.46 | 7.47 | 7.42 | 7.42 | 7.40 | 7.39 | 7.50 | 7.36 | 7.28 | 7.17 | 7.01 |
| | | Log G3" | 7.18 | 7.14 | 6.94 | 6.73 | 6.61 | 6.53 | 7.21 | 7.09 | 6.93 | 6.79 | 6.57 |
| | Processability | | Good | Good | Good | Good | Good | NG | Good | Good | Good | Good | Good |
| Ball Prop- erties | Cover thickness (mm) | | 0.5 | 0.5 | 0.5 | 0.5 | 0.5 | 0.5 | 0.5 | 0.5 | 0.5 | 0.5 | 0.5 |
| | Dry spin rate on Approach shots (rpm) | | 6450 | 6520 | 6652 | 6910 | 7052 | 7155 | 6412 | 6600 | 6803 | 6942 | 7210 |
| | Wet spin rate on Approach shots (rpm) | | 4200 | 4702 | 5248 | 5703 | 5254 | 4755 | 4255 | 5302 | 5410 | 5102 | 3988 |
| | Spin retention (wet/dry) % | | 65 | 72 | 79 | 83 | 75 | 66 | 66 | 80 | 80 | 73 | 55 |
| | Dry Approach Performance | | P | P | G | G | G | G | P | G | G | G | G |
| | Wet Approach Performance | | P | G | G | G | G | G | P | G | G | G | P |

Cover material: polyurethane 100 parts, titanium oxide 4 parts

Materials in Tables 3 to 4:

H$_{12}$MDI: Desmodur available from Sumika Bayer Urethane Co., Ltd.

PTMG650 (Number average molecular weight 650): Poly THF 650 Polyether available from BASF Co.

PTMG1000 (Number average molecular weight 1000): Poly THF 1000 Polyether available from BASF Co.

PTMG2000 (Number average molecular weight 2000): Poly THF 2000 Polyether available from BASF Co.

PTMG1400 (Number average molecular weight 1400): Blend of PTMG1000 and PTMG2000, PTMG1000:PTMG2000=0.6:0.4

PTMG1700 (Number average molecular weight 1700): Blend of PTMG1000 and PTMG2000, PTMG1000:PTMG2000=0.3:0.7

BD: 1,4-butanediol available from WAKO Pure Chemicals, Industries, Ltd.

Dibutyl tin dilaurate: dibutyl tin dilaurate available from Aldrich.

Golf balls No. 1 to 10, 13 to 16, and 18 to 20 are golf balls having a cover that is formed from a golf ball cover material having shear loss moduli G1" (Pa), G2" (Pa), and G3" (Pa) that satisfy following equations when measured using a dynamic viscoelasticity measuring apparatus at following conditions.

$$\log G1'' \leq 7.09 \quad (1)$$

$$\log G2'' \geq 7.17 \quad (2)$$

$$\log G3'' \leq 7.14 \quad (3)$$

G1" measuring conditions: shear mode, oscillation frequency: 10 Hz, temperature: 0° C., strain: 0.05%;
G2" measuring conditions: shear mode, oscillation frequency: 10 Hz, temperature: −30° C., strain: 0.05%; and
G3" measuring conditions: shear mode, oscillation frequency: 10 Hz, temperature: 0° C., strain: 5%.

The results showed that all the golf balls of the present invention have high dry spin rate and wet spin rate. With respect to the golf balls No. 6 to 8, 13 to 15, and 18 to 20 that have JIS-A hardness of 74 or more, there was no blocking problem on the cover materials and the processability into the cover was excellent. Golf ball No. 21 is the case that the cover material having JIS-A hardness of 77 is used. The result showed that merely using the soft material does not improve the wet spin rate.

According to the present invention, it is possible to provide a golf ball that quickly stops on approach shots from the fairway and the rough. This application is based on Japanese Patent application No. 2010-191133 filed on Aug. 27, 2010, the contents of which are hereby incorporated by reference.

What is claimed is:

1. A golf ball cover material comprising polyurethane as a resin component,
wherein the polyurethane has a polyol component with a number average molecular weight ranging from 650 to 1,700 as a constituent, and the golf ball cover material has shear loss moduli G1" (Pa), G2" (Pa), and G3" (Pa) that satisfy following equations when measured using a dynamic viscoelasticity measuring apparatus at following conditions:

$$\log G1'' \leq 7.09 \quad (1)$$

$$\log G2'' \geq 7.17 \quad (2)$$

$$\log G3'' \leq 7.14 \quad (3)$$

G1" measuring conditions: shear mode, oscillation frequency: 10 Hz, temperature: 0° C., strain: 0.05%;
G2" measuring conditions: shear mode, oscillation frequency: 10 Hz, temperature: −30° C., strain: 0.05%; and
G3" measuring conditions: shear mode, oscillation frequency: 10 Hz, temperature: 0° C., strain: 5%.

2. The golf ball cover material according to claim 1, wherein log G3" ranges from 6.00 to 7.09.

3. The golf ball cover material according to claim 1, wherein the polyurethane has polytetramethylene ether glycol as a polyol component.

4. The golf ball cover material according to claim 1, wherein the polyurethane has dicyclohexylmethane diisocyanate as a polyisocyanate component.

5. The golf ball cover material according to claim 1, wherein the polyurethane has a chain extender having a molecular weight ranging from 30 to 400.

6. The golf ball cover material according to claim 1, wherein the polyurethane has 1,4-butane diol as a chain extender component.

7. The golf ball cover material according to claim 1, wherein the golf ball cover material has JIS-A hardness of 74 or more.

8. A golf ball comprising a core and a cover covering the core, wherein the cover is formed from a golf ball cover material comprising polyurethane as a resin component,
wherein the polyurethane has a polyol component with a number average molecular weight ranging from 650 to 1,700 as a constituent, and the golf ball cover material has shear loss moduli G1" (Pa), G2" (Pa), and G3" (Pa) that satisfy following equations when measured using a dynamic viscoelasticity measuring apparatus at following conditions:

$$\log G1'' \leq 7.09 \quad (1)$$

$$\log G2'' \geq 7.17 \quad (2)$$

$$\log G3'' \leq 7.14 \quad (3)$$

G1" measuring conditions: shear mode, oscillation frequency: 10 Hz, temperature: 0° C., strain: 0.05%;
G2" measuring conditions: shear mode, oscillation frequency: 10 Hz, temperature: −30° C., strain: 0.05%; and
G3" measuring conditions: shear mode, oscillation frequency: 10 Hz, temperature: 0° C., strain: 5%.

9. The golf ball according to claim 8, wherein log G3" ranges from 6.00 to 7.09.

10. The golf ball according to claim 8, wherein the polyurethane has polytetramethylene ether glycol as a polyol component.

11. The golf ball according to claim 8, wherein the polyurethane has dicyclohexylmethane diisocyanate as a polyisocyanate component.

12. The golf ball according to claim 8, wherein the polyurethane has a chain extender having a molecular weight ranging from 30 to 400.

13. The golf ball according to claim 8, wherein the polyurethane has 1,4-butane diol as a chain extender component.

14. The golf ball according to claim 8, wherein the cover has a thickness ranging from 0.3 mm to 2.0 mm.

15. The golf ball according to claim 8, wherein the cover material has JIS-A hardness of 74 or more.

16. The golf ball according to claim 8, wherein the core has a compression deformation amount of 2.40 mm or more and 3.20 mm or less, when applying a load from 98 N as an initial load to 1275N as a final load to the core.

* * * * *